No. 726,959. PATENTED MAY 5, 1903.
L. MAYBAUM.
COMBINED WRITING AND ADDING MACHINE.
APPLICATION FILED MAR. 21, 1902.
NO MODEL. 7 SHEETS—SHEET 4.

FIG. 4

WITNESSES:
Geo. D. Richards
William Clark

INVENTOR:
LEVY MAYBAUM,
BY
Fred C. Fraentzel,
ATTORNEY

No. 726,959. PATENTED MAY 5, 1903.
L. MAYBAUM.
COMBINED WRITING AND ADDING MACHINE.
APPLICATION FILED MAR. 21, 1902.
NO MODEL. 7 SHEETS—SHEET 5.

FIG. 5

WITNESSES: INVENTOR:
Geo. S. Richards LEVY MAYBAUM
William Clark. BY
Fred'k C. Fraentzel,
ATTORNEY No. 726,959. PATENTED MAY 5, 1903.
L. MAYBAUM.
COMBINED WRITING AND ADDING MACHINE.
APPLICATION FILED MAR. 21, 1902.
NO MODEL. 7 SHEETS—SHEET 6.

WITNESSES:
Geo. S. Richards
William Clark

INVENTOR:
LEVY MAYBAUM,
BY
Fred L. Fraentzel,
ATTORNEY

No. 726,959. PATENTED MAY 5, 1903.
L. MAYBAUM.
COMBINED WRITING AND ADDING MACHINE.
APPLICATION FILED MAR. 21, 1902.
NO MODEL. 7 SHEETS—SHEET 7.

WITNESSES:
Geo. S. Richards
William Clark

INVENTOR:
LEVY MAYBAUM,
BY Fred C. Fraentzel
ATTORNEY

No. 726,959. Patented May 5, 1903.

UNITED STATES PATENT OFFICE.

LEVY MAYBAUM, OF NEWARK, NEW JERSEY, ASSIGNOR, BY DIRECT AND MESNE ASSIGNMENTS, TO THE AMERICAN CALCULATING MACHINE COMPANY, A CORPORATION OF NEW JERSEY.

COMBINED WRITING AND ADDING MACHINE.

SPECIFICATION forming part of Letters Patent No. 726,959, dated May 5, 1903.

Application filed March 21, 1902. Serial No. 99,262. (No model.)

*To all whom it may concern:*

Be it known that I, LEVY MAYBAUM, a citizen of the United States, residing at Newark, in the county of Essex and State of New Jersey, have invented certain new and useful Improvements in a Combined Writing and Adding Machine; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The present invention has reference to improvements in that class of writing and adding machines adapted more especially for use in banking-houses and mercantile and other establishments where the figures of a number of checks, &c., are written on a sheet of paper and placed in a column thereon for future reference and beneath which column of figures the aggregate amount or sum-total of the said figures is to be written, the said figures of the aggregate amount being obtained directly from an inspection of a set of registering wheels or disks employed with my invention.

The principal object of my invention is to provide simple and efficient mechanism of the character hereinafter described which may be regarded in the nature of an attachment that can be applied to existing forms of typewriting machines and wherein little or no structural change of the machine itself is necessary to apply the attachment.

With the various objects of the invention in view the said invention consists in the several novel organizations and combinations of devices and their parts, all of which will be more fully described in the accompanying specification and then finally embodied in the clauses of the claim.

The results heretofore set forth are attained by means of mechanism shown in the accompanying drawings, in which I have illustrated one complete embodiment of the principles of this invention, and in which similar characters of reference are employed to designate corresponding parts throughout the several views.

In the said drawings.

Referring to the several figures of the drawings, the reference character 1 indicates the usual form of platen-roll mounted and supported so as to be capable of revolution in a frame 2, commonly termed the "carriage." This carriage or frame is placed directly upon a pair of guide-rails 4 and 5 of the main body or frame 3, so as to be capable of a laterally-sliding motion upon said rails, the parts being arranged and constructed in any suitable manner, preferably being made in the ordinary manner of construction of a typewriter. The said lateral motion of the carriage upon said slides or rails 4 and 5 is produced during the operation of printing or writing, and the usual spacing between the printed symbols is made by means of any suitable mechanism, as 6, provided for that purpose and which is actuated by means of a suitable arrangement of type-actuating levers 7 and a spacing-lever 7', as in any of the known constructions of type-writing machines, and the return by hand of the carriage 2 and its platen-roll 1 to any point indicated on a scale or index 8 upon the front or main body or frame 3 is produced by any known form of hand-lever 9 or any other suitably-arranged mechanism well known to those versed in the art pertaining to the various constructions of type-writing machines. Suitably secured to the front of the carriage 2 is a pointer 10, which moves in the front of the scale 8 to indicate the point at which the carriage is set.

Figure 6:
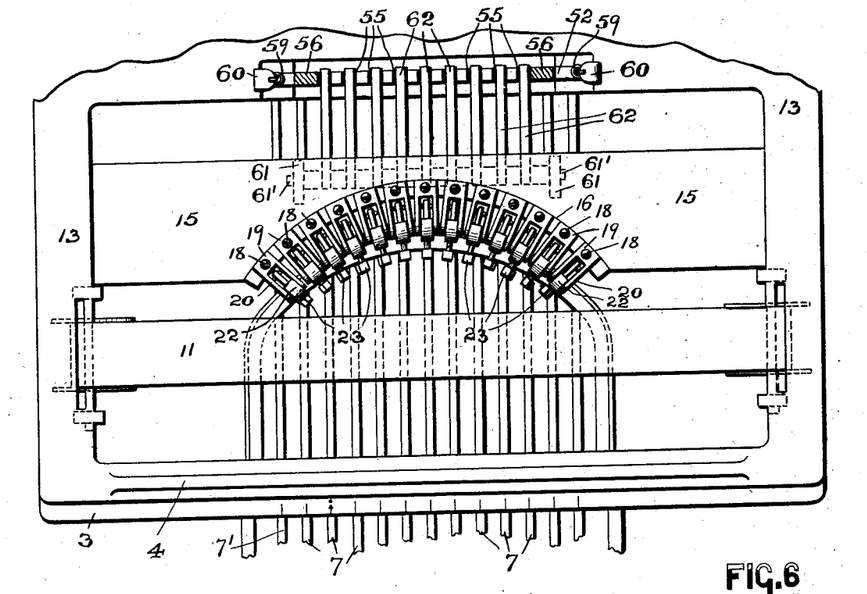
Fig. 6 is a horizontal section of the various parts of the machine just below the movable carriage, said section being taken on line 6 in said Fig. 3.
Figure 7:
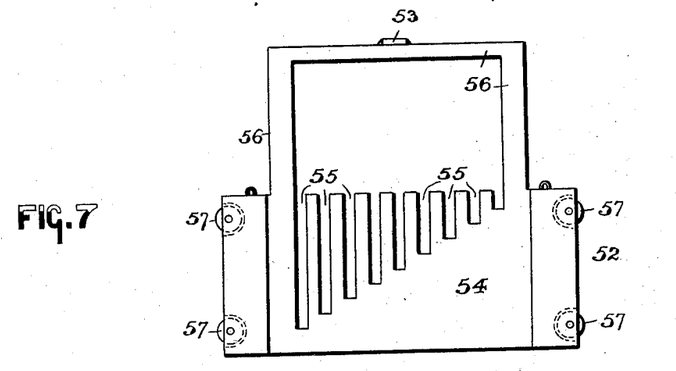
Fig. 7 is a detail front view of the actuating-slide which is used in connection with the various parts of the machine.

As illustrated, the main body or frame 3 is provided with any suitable printing device, as a ribbon 11, against which the matrix is brought to print the desired symbol on the face of the paper 12, which is arranged upon and passes over the cylindrical surface of the platen-roll 1, substantially in the manner illustrated. The said main body or frame 3 is preferably made with the marginal edge portions 13, the side portions being usually made with downwardly-extending ribs 14, with which is connected in any suitable manner a laterally-extending cross piece or frame 15, and all the parts being preferably arranged in such a manner that the upper face of the said main body or frame 3 will be open, substantially as illustrated in Fig. 6 of the drawings. The said cross piece or frame 15 is also provided with a curved cut-away or open part, as 16, the center of the arc which bounds the said open part being directly in a point on the ribbon 11. As shown, the said cross piece or frame 15 is also made with a downwardly and outwardly extending receiving-shoulder 17, which is concentric with the arc that bounds the said cut-away or open part 16 of the cross piece or frame 15. Suitably secured upon the said shoulder 17 by means of screws 18 or in other suitable manner are a set of bearings 19, all of which are arranged upon the support formed by the shoulder 17, so that they all radiate toward one and the same point, which is located upon the ribbon 11 and is the center of the arc-shaped marginal edge of the part 16 and the arc-shaped shoulder 17. Each bearing or bracket 19 is made with a pair of fingers 20, between each pair of which is pivoted an eye portion 22 of a type-bar 21, having the symbol-bearing matrix 23. Each eye portion 22 is made with a rearwardly-extending finger or stud 24, which is pivotally connected with the upper end of a connecting wire or link 25. The lower end portion of each link 25 is preferably made with a screw portion, by means of which it is adjustably connected with a turnbuckle 26, suitably secured, by means of a holding-clasp 27 or other means, to the proper type-bar-actuating levers 7, substantially as illustrated.

Figure 1:
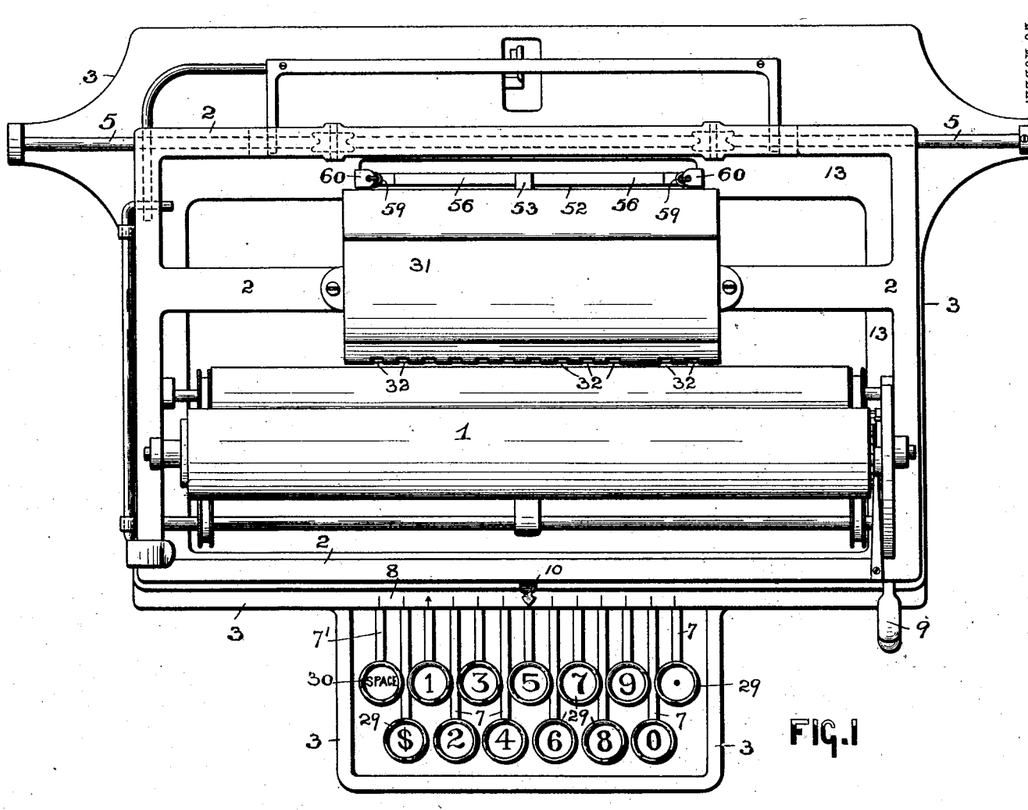
Figure 1 is a top or plan view of one form of adding-machine provided with mechanism representing one embodiment of the principles of the present invention.

Each lever 7 rests at or near its rear end upon a suitable spring, as 28, which returns the lever 7 to its normal position at rest after it has been depressed for bringing the matrix 23 of the type-bars 21 in its printing position against the printing-ribbon 11, and thereby print the symbol upon the surface of the paper 12. As will be seen from an inspection of Fig. 1 of the drawings, I have provided the present construction of machine with twelve of such levers 7 and a corresponding number of type-bars 21, the said levers 7 being provided with the operating keys or finger-pieces 29, nine of such keys bearing the digit-symbols from "1" to "9," inclusive, and the remaining keys being respectively provided with a cipher, a dollar-mark, and a decimal-point. Then also there is the extra spacing-lever 7', hereinabove mentioned, which is provided with a key or finger-piece 30, bearing the word "Space." This number of keys and type-actuating levers 7 and spacer is all that is required for a successfully-operating tabulating or adding machine embodying the principles of my present invention; but it will be clearly evident that I may use in connection with my invention with but slight alterations in the general construction of the apparatus other sets of keys, type-bar-actuating levers, and type-bars bearing the different letters of the alphabet and other symbols, such as punctuation-marks, whereby the machine may also be used as an ordinary type-writing machine.

Figure 5:
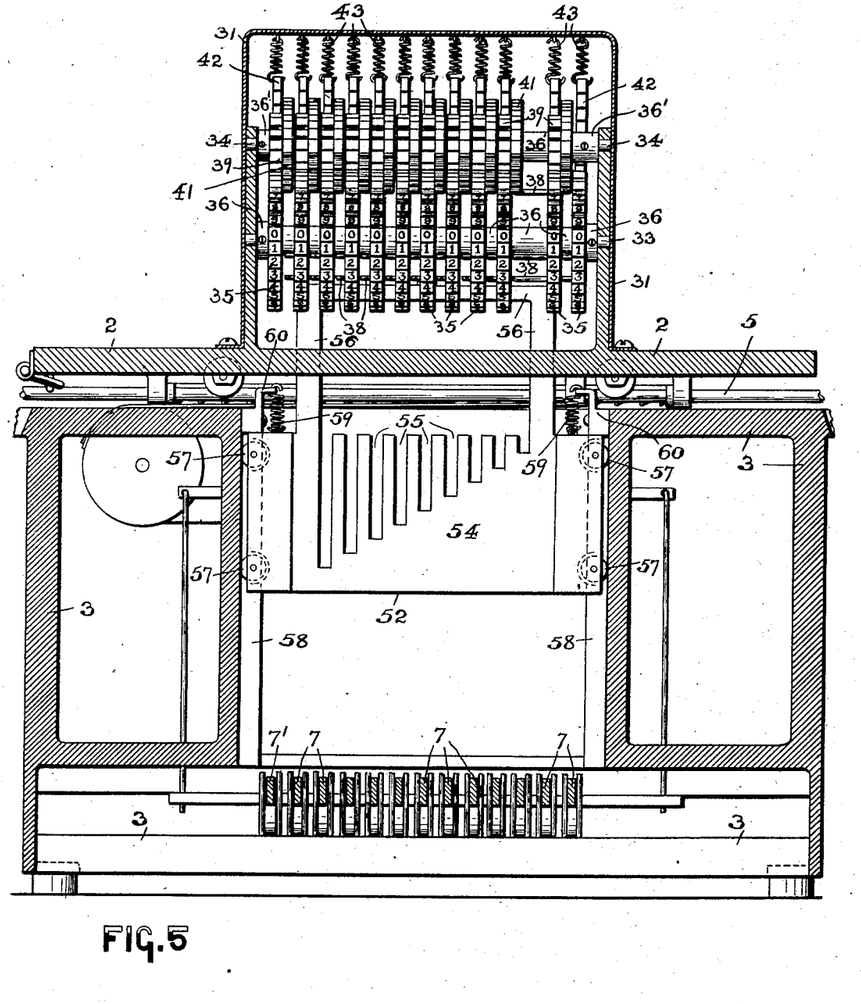
Fig. 5 is a vertical section taken on line 5 5 in Fig. 3 of the drawings, with the various registering-disks and an actuating-slide illustrated in elevation.

Having thus described one general arrangement of type-bars and the actuating means therefor, I will describe in a general way one construction of registering device and an intermediately-arranged mechanism for actuating the indicating wheels or disks of the said device for indicating to the operator after he has written or printed upon the paper 12 the aggregate amount or sum-total of all the figures in dollars and cents. The said registering or indicating device consists, essentially, of a suitably-constructed casing or box 31, which is provided with any suitable number of openings 32, through which the symbols on a set of registering or indicating wheels are exposed to view. The said casing or box is arranged in any desired and suitable position upon the carriage 2, and therefore moves with said carriage, substantially as and for the purpose to be presently more fully described. Referring more particularly to Fig. 5 of the drawings, I have provided the said casing or box 31 with a pair of rods 33 and 34, the said lower rod 33 having rotatively arranged thereon any suitable number of indicating disks or wheels 35, all separated from each other by means of collars 36, so as to form intervening spaces between the disks and the inner sides of the casing and the two end disks, substantially as illustrated. In the present construction I have represented an arrangement of twelve of such disks or wheels 35, the two on the right-hand side being for the purpose of in- dicating any amounts written from one cent to ninety-nine cents, inclusive, while the remaining disks are for the purpose of indicating amounts from one dollar to nine billion nine hundred and ninety-nine million nine hundred and ninety-nine thousand nine hundred and ninety-nine dollars, if necessary; but it will be understood that I may employ a greater or smaller number of such disks or wheels 35, if desired. As will be seen from an inspection of said Fig. 5, the "units-dollars" disk and the "tens-cents" disks 35 are separated by a collar 36, which is twice the width of any one of the other collars, so as to provide a proper space for the decimal-point or period used in writing to separate the dollar-numbers from the numbers which indicate the cents. Each of the said disks or wheels 35 is made with ratchet-like teeth 37 for the purpose hereinafter set forth, and for sake of compactness in construction I have provided each disk 35 with thirty of such teeth, which are numbered in consecutive order—thus "0123456789," "0123456789," and "0123456789." It will, however, be understood that if the said disk 35 is made sufficiently large it may have but one set of ten of such teeth 37 and corresponding symbols from "0" to "9," inclusive, or any multiple of ten of such teeth 37 may be used. Furthermore, each wheel or disk 35, except the last one at the left, is provided with one or more laterally-extending pins 38; but in the present case, owing to the arrangement of thirty teeth 37 and corresponding number of symbols on each disk 35, there are three laterally-extending pins 38 on each disk for the purpose hereinafter set forth.

Figure 3:
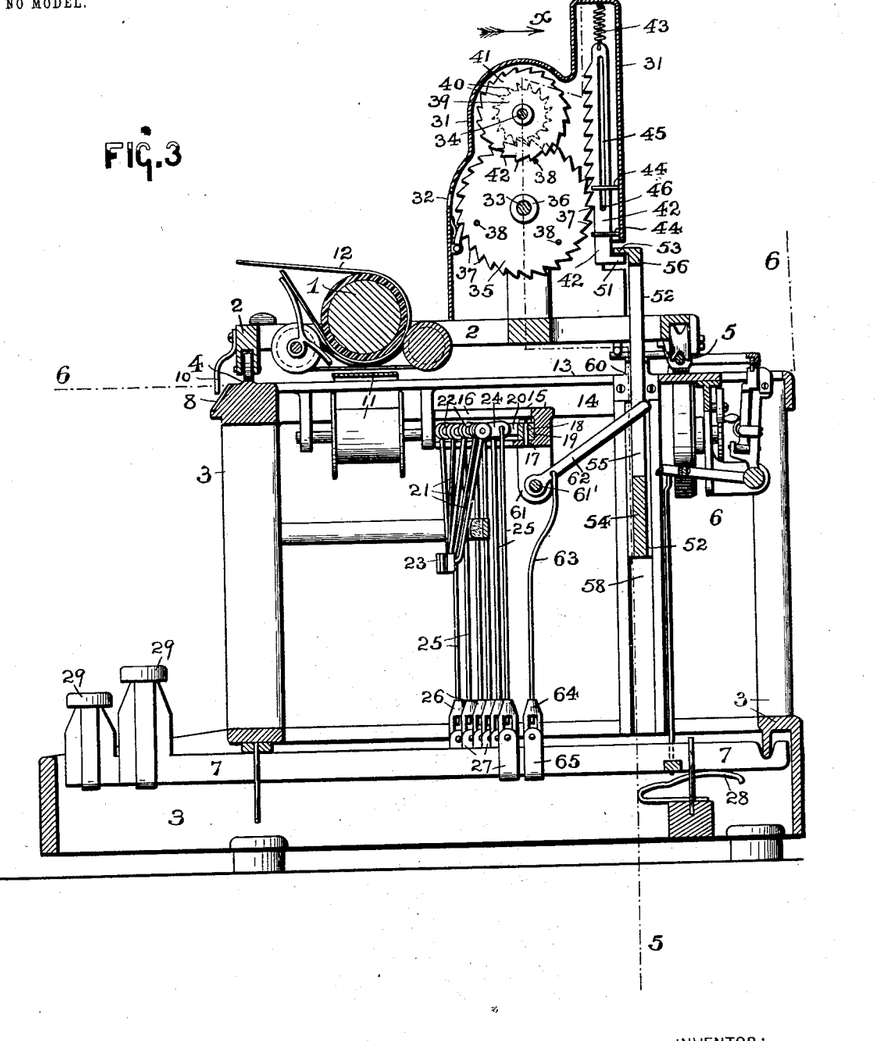
Fig. 3 is a central vertical section of the machine with the several parts of the actuating mechanism in their normally inoperative positions.
Figure 4:
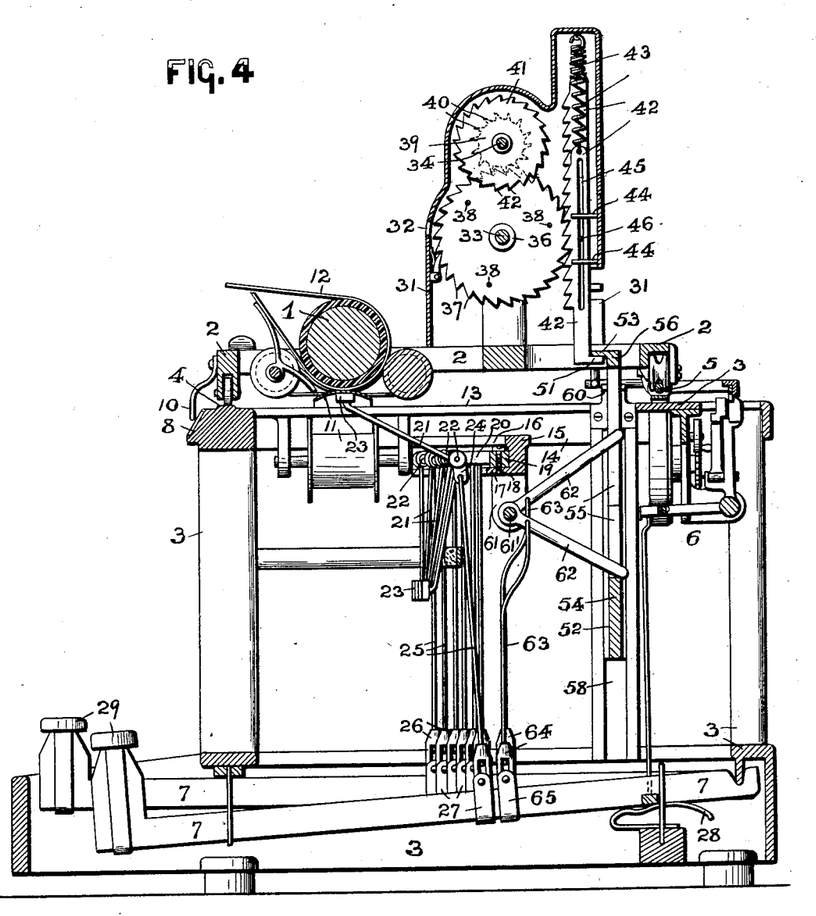
Fig. 4 is a similar section of the same parts, illustrating one of the keys and connecting mechanism for actuating a registering-disk in its operated position.
Figure 8:
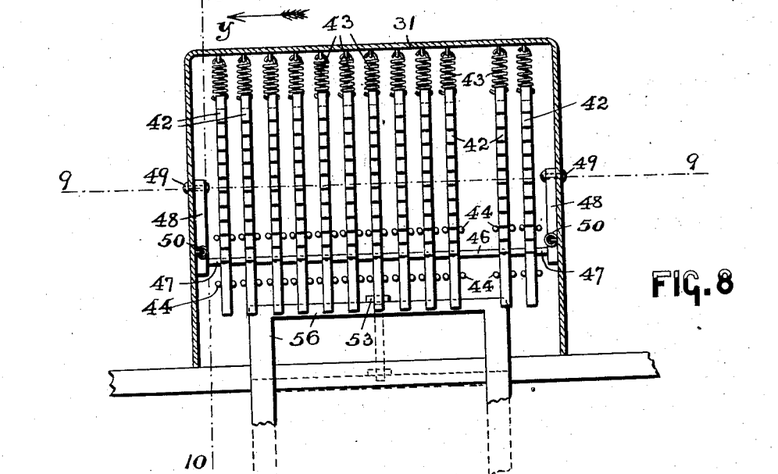
Fig. 8 is a face view of the said actuating-slide and a set of racks adapted to be actuated by said slide for manipulating the said indicator-disks of the registering device, the casing of said device being represented in vertical section.
Figure 9:
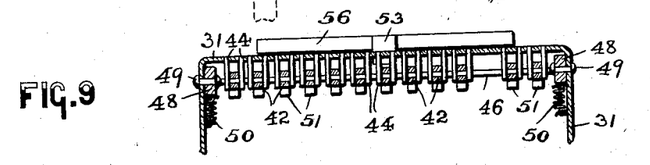
Fig. 9 is a horizontal section of the said parts, taken on line 9 9 in said Fig. 8.
Figure 10:
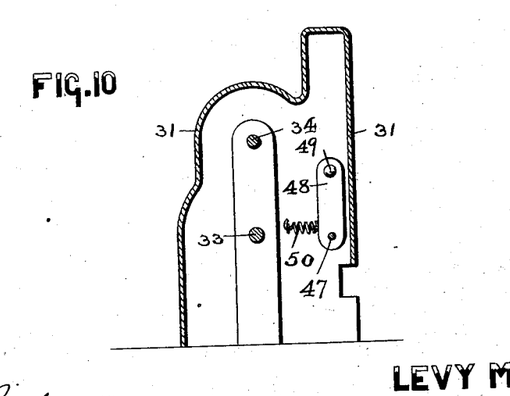
Fig. 10 is a detail vertical section taken on line 10 10 in the same figure looking in the direction of arrow Y.

Upon the upper rod 34, as will be seen from an inspection of Figs. 3, 4, and 5, there is an arrangement of ratchet wheels or disks 39, the teeth 40 of said wheels or disks 39 always being in mesh or engagement with the teeth 37 of the numbering or indicating disks 35, as clearly illustrated in said Figs. 3 and 4, and each wheel or disk 39 being provided at its side with a pinion wheel or disk 41 of a larger diameter than its adjacent ratchet wheel or disk 39, so that the peripheral edges of the several pinion-wheels, provided with the teeth 41', as shown, will extend down alongside of the numbering or indicating wheels 35, so as to bring at the proper time one of the laterally-extending pins 38 of the next lower indicating-disk 35 in operation, contact, or engagement with one of the teeth 41' of the pinion-wheel 41 for the purpose of thereby moving the next higher indicating-disk 35 for a distance equaling one indicating space or tooth in the manner to be presently described. The said wheels or disks 39 and 41 are loosely and rotatively arranged upon the said upper rod 34 and are adapted to be actuated—that is, each disk 35—by a series of racks 42. These racks 42, as will be noticed from an inspection of Figs. 3, 4, 5, 8, and 9, are suspended in the back of the casing or box 31 by means of suitable springs 43, guide-pins or projections, as 44, being employed to prevent lateral displacement of the said racks 42 while being pulled in a downward direction by the actuating mechanism to be presently described. Furthermore, the said racks are made with elongated slots or openings 45, and 46 is a rod which passes through the said slots or openings 45 and has its ends 47 connected with suitable arms or levers 48, which are pivotally arranged against the inner sides of the casing or box 31 on suitable pins 49, substantially as illustrated in Figs. 8, 9, and 10. Thus when a rack 42 is forced in its downward direction to actuate one of the registering or indicating disks 35 by means of the engaging teeth (see Figs. 3 and 4) and has been released by the actuating mechanism, in the manner to be presently described, then the teeth, owing to their angular construction, will become disengaged, due to the fact that the distended coils of the spring 43, connected with said rack 42, will cause said rack to return to its initial starting position. The racks all being connected by means of the rod 46 with the pivoted arms or levers 48 permit of this disengagement of the various teeth without undue resistance or wear, while another pair of springs 50, connected with said levers or arms 48 and the sides of the casing or box 31, will again return all the racks into operative engagement with the respective disks 35 when the parts have been returned to their initial positions.

To independently actuate each rack 42 and cause a downward movement of each rack corresponding to either one, two, three, or more teeth, inclusive of nine teeth, as may be necessary, each rack 42 is provided at its lower end with a stud, projection, or finger 51, with each of which can be made to engage a similarly-arranged stud, projection, or finger 53 of a suitably-constructed slide 52. This slide consists, essentially, of a body 54, in which there are nine vertically-arranged slots, all varying in depth, the slot on the right-hand side of the body being the shortest in depth and the other slots from the right to the left side of the body in their consecutive order being made proportionately of greater depth as shown. The said body is also made with a suitably-constructed frame portion 56, provided with the stud, projection, or finger 53, hereinabove mentioned, and 57 represents suitably-disposed rollers by means of which the slide is operatively retained in a vertically-sliding relation between a pair of guides 58 or other means connected with the main body or frame 3 of the machine. The said slide is retained in its said normally inoperative position in the upper portion of the said main body or frame 3 (indicated in Fig. 5 of the drawings) by means of suspension-springs 59, which are secured to said slide and suitable portions, such as brackets 60, on the said main body or frame 3, as will be clearly understood from an inspection of said Fig. 5.

Now, returning to Figs. 3, 4, and 6 of the drawings, it will be seen that I have arranged between a pair of bearings 61, extending from the lower side of the previously-mentioned cross piece or frame 15, and preferably from the shoulder 17, a cross rod or bar 61'. Upon the said rod or bar 61' is an arrangement of rearwardly-extending actuating arms or fingers 62, all in proper alinement, said actuating arms or fingers corresponding in number with the number of slots 55 in the body of the slide 52 and each arm or finger 62 extending into a slot, as clearly illustrated. Each finger or arm 62 has connected therewith a wire rod or link 63, which is attached at its lower end by means of a turnbuckle 64 and a clasp 65 with the correspondingly-placed type-bar-actuating levers 7.

Before describing more particularly the operation of the various devices for printing upon the paper and at the same time actuating the "totaling-disks" of the registering device I will briefly state that while the slide 52 and its parts are capable of a vertical movement they have no lateral movement, and its stud, projection, or finger 53 is always in the same relatively vertical position, but that the registering device being placed upon the laterally-moving carriage the studs, projections, or fingers on the respective racks 42 are intermittently moved directly beneath the single stud, projection, or finger 53 of the slide 52 and can therefore be brought in engagement with any one of the studs, projections, or fingers of any one of the racks 42, according to the indicating-disk 35 which the operator desires to actuate.

In the present construction of apparatus the type-bar-actuating levers 7 for the purpose of the printing of the symbols "1" to "9," inclusive, are only provided with the correspondingly-placed slide-operating arms or fingers 62 and that there are no such arms or fingers used in connection with the type-bars employed for the printing upon the paper of those symbols which indicate the cipher, decimal-point, dollar-sign, and the space.

Figure 2:
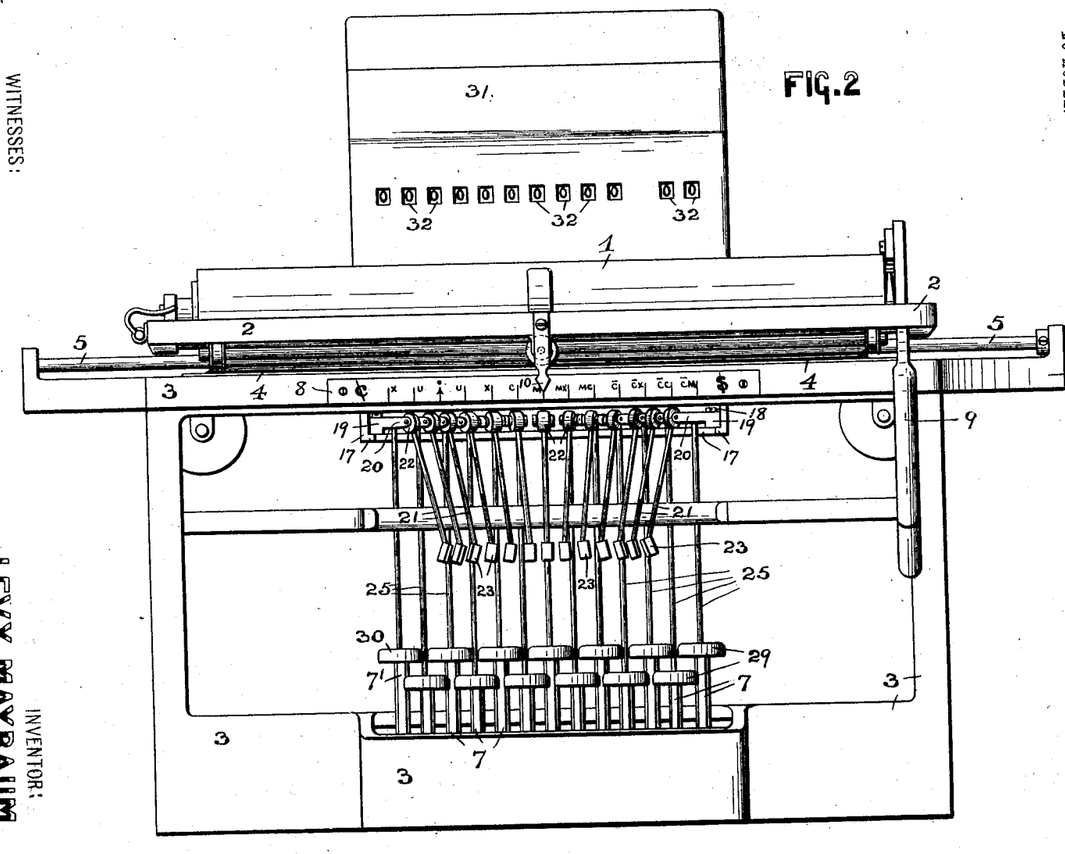
Fig. 2 is a front view of the present invention.

I will now attempt to describe the operations of the devices of the apparatus and illustrate its use as an adding-machine. Suppose a clerk in a bank in balancing an account wishes to tabulate the following amounts: "2,109.65," "5.00," "6.02," "30.69," "711.00," and "1,045.82," and then to know at once the total, "3,908.18," so that it can be printed beneath the column of the previous figures, without having been compelled to add the said figures. The machine is used in the manner of an ordinary type-writing machine. Referring to Fig. 2 of the drawings, in writing the first number, "2,109.65," the operator places the carriage 2 in such a position that the pointer 10 points to the division in the scale 8 which indicates "M" of the dollar-column of figures to be written. This movement of the carriage has brought the finger or projection 51 of the rack 42 which is to actuate the indicating wheel or disk 35 bearing the numbers which indicate the "thousands" directly beneath the finger or projection 53 of the slide 52, as will be clearly evident. The operator then depresses the key having on its face the numeral "2." Simultaneously with the printing of a "2" upon the paper the actuating-arm 62, directly operated from the same type-bar-actuating lever 7, is forced farther down into the second slot in the body of the slide 52 until it reaches the bottom of said slot, and thereby produces a sufficient movement of the slide 52, which forces the corresponding rack 42 down a distance equal to two teeth and causes the actuated indicating-wheel to display the number "2." When the key is released by the operator, all the parts except the indicating-wheel return to their initial positions, while the carriage 2 moves from right to left one division on the scale 8, thereby bringing the pointer 10 opposite the "C" division. At the same time the finger 51 of the "hundreds-disk" 35 is brought directly beneath the finger of the slide 52, and by depressing the "1" key the corresponding arm 62 causes the slide 52 and the corresponding rack 42 to move over a space equal to one tooth, and the proper disk shows up a "1." The carriage after the key has been released and the parts have returned to their initial positions, except, of course, the hundreds-disk, moves over space, bringing the pointer 10 over the "X" division on the scale. The cipher-symbol is now desired, and the operator depresses the "0" key, and the carriage after the key is released simply moves one space, leaving the "0" on the third disk 35 exposed to view. The next symbol desired is "9." By properly operating the "9" key the corresponding arm or finger 62 causes the slide 52 and rack 42 to move over a distance equal to nine teeth, whereby the numeral "9" is exposed to view upon the next disk 35. After the release of the key the pointer 10 of the carriage is brought over the "." division on the scale, and the point can be printed by depressing the proper key without changing the positions of the registering or indicating disks. In like manner the "6" and "5" in the cents-column can be indicated by the movements of the proper disks 35, which are actuated in the same manner as hereinabove described. Now if the disks are inspected they will read from left to right thus, "2109.65," while the same number will have been printed upon the paper. The platen-roll 3 is now turned, by means of the lever 9 or other means, to move the paper one line-space. The next number to be printed is "5.00." The carriage is then moved back so that the pointer 10 will be located over the "U" division in the scale 8 and the "5" key depressed. The "units-disk" of the registering device is actuated in the same manner as hereinabove described by means of the slide 52, and the proper rack 42 slides for a distance of five teeth. It will, however, be seen that while a "5" has been printed upon the paper in the "units-column" the units-disk of the registering device having been at "9" will move from "9" over "0," "1," "2," and "3" to "4" and that the laterally-extending pin 38 of the lower indicating-disk 35 will cause a one-tooth movement of the pinion wheel or disk 41, which operates the corresponding ratchet-disk 39, and thereby causes the next higher indicator-disk 35, in the present instance the "tens-disk," to present to view a "1." Thus while upon the paper there appear the two numbers "2109.65" and "5.00" printed directly under each other the registering-disk will read "2114.65," which is the sum of the two numbers. In this manner by returning the carriage-index 10 to the proper place on the scale 8 after the writing of each figure any number of figures from the units into the millions, &c., can be printed in a column and at the end the sum-total "3908.18," supposing all the figures hereinabove mentioned to have been printed, can be read from the exposed portions of the indicating-disks and then printed directly beneath the column of printed figures upon the paper. The indicating-disks 35 of the registering device can then all be returned to their "0" positions (indicated in Figs. 2 and 5) by the proper manipulation of the respective keys of the apparatus or by any other well-known mechanism directly connected with the said registering device.

Having thus described my invention, what I claim is—

1. The combination, with a type-writer having a vertically-movable actuating device, of an adding device movable horizontally on said type-writer, said adding device having a series of vertically-movable devices adapted to interlock successively with said actuating device, substantially as described.

2. In a combined writing and adding machine, the combination, with a main frame, its printing type-bars and type-bar-actuating levers, of a carriage on said frame, means for producing a lateral motion of said carriage, a registering device provided with registering-disks moving simultaneously with the carriage and in the same direction, a slide in said frame fixed against lateral movement but being capable of vertical movements through different spaces, means connected with said slide for variously actuating the registering-disks, and means between the said type-bar-actuating levers and the said slide for producing a downward vertical movement of said slide, substantially as and for the purposes set forth.

3. In a combined writing and adding machine, the combination, with a main frame, its printing type-bars and type-bar-actuating levers, of a carriage on said frame, a platen-roll, means for rotating said platen-roll, mechanism for producing a lateral motion of said carriage, a registering device provided with registering-disks moving simultaneously with the carriage and in the same direction, a slide in said frame fixed against lateral movement but being capable of vertical movements through different spaces, means connected with said slide for variously actuating the registering-disks, and means between the said type-bar-actuating levers and the said slide for producing a downward vertical movement of said slide, substantially as and for the purposes set forth.

4. In a combined writing and adding machine, the combination, with a main frame and printing type-bars, of a carriage on said frame, means for causing a lateral motion of said carriage, and a registering device on said carriage, comprising a series of indicating-disks, a corresponding number of toothed racks, for actuating each disk separately, and means in the main frame for actuating said racks, substantially as and for the purpose set forth.

5. In a combined writing and adding machine, the combination, with a main frame and printing type-bars, of a carriage on said frame, means for causing a lateral motion of said carriage, and a registering device on said carriage, comprising a series of indicating-disks, a corresponding number of toothed racks for actuating each disk separately, and means in the main frame for actuating said racks, comprising, a vertically-moving slide in said main frame, provided with a series of slots of various depths, a means of connection on said slide adapted to be brought in operative but independent engagement with said racks, and means connected with said type-bars for actuating said slide, substantially as and for the purpose set forth.

6. In a combined writing and adding machine, the combination, with a main frame and printing type-bars, of a carriage on said frame, a platen-roll on said carriage, means for rotating said platen-roll, means for operating said type-bars, and mechanism for producing a lateral motion of said carriage, and a registering device on said carriage, comprising, a series of indicating-disks, a corresponding number of toothed racks, for actuating each disk separately, and means in the main frame for actuating said racks, substantially as and for the purpose set forth.

7. In a combined writing and adding machine, the combination, with a main frame and printing type-bars, of a carriage on said frame, a platen-roll on said carriage, means for rotating said platen-roll, means for operating said type-bars, and mechanism for producing a lateral motion of said carriage, and a registering device on said carriage, comprising, a series of indicating-disks, a corresponding number of toothed racks for actuating each disk separately, a vertically-moving slide on said main frame provided with a series of slots of varying depths, a means of connection on said slides adapted to be brought in operative but independent engagement with said racks, and means connected with said type-bars for actuating said slide, substantially as and for the purpose set forth.

8. In a combined writing and adding machine, the combination, with printing type-bars and type-bar-actuating levers, of a laterally-moving registering mechanism, comprising a set of registering-disks, and means actuated from said type-bar-actuating levers for operating the said registering-disks, comprising a slide fixed against lateral movement but capable of vertical movements through spaces of different lengths for variously actuating said registering-disks, substantially as and for the purposes set forth.

9. In a combined writing and adding machine, the combination, with the printing type-bars, and type-bar-actuating levers, of a registering mechanism, comprising, a series of independently-rotating indicating-disks, a corresponding number of toothed racks for actuating each disk separately, and means actuated from said type-bar-actuating levers, for actuating the said racks, comprising a slide fixed against lateral movement but being capable of vertical movements through different spaces for variously moving said racks, substantially as and for the purpose set forth.

10. In a combined writing and adding machine, the combination, with the printing-type-bar-actuating levers, of a registering mechanism, comprising, a series of independently-rotating indicating-disks, a corresponding number of toothed racks for actuating each disk separately, a vertically-moving slide in said main frame provided with a series of slots of various depths, a means of connection on said slide adapted to be brought into operative but independent engagement with said racks, and means connected with said type-bar-actuating levers for actuating said slide, substantially as and for the purpose set forth.

11. In a combined writing and adding machine, the combination, with a main frame, of a laterally-moving registering device above the said frame, a slide in said frame, said slide being fixed against lateral movement but being capable of vertical movements through spaces of different lengths, a means of connection on said slide for actuating the indicating mechanism of said device, and means for actuating the said slide while writing, substantially as and for the purpose set forth.

12. In a combined writing and adding machine, the combination, with a main frame, of a laterally-moving registering device above the said frame, a vertically-moving slide in said frame, a means of connection on said slide for actuating the indicating mechanism of said device, and means for actuating the said slide while writing, the said slide being provided with a series of slots of varying depths, a series of printing type-actuating bars or levers, and a rearwardly-extending arm connected with each of said bars and levers, each arm extending into a slot in the said slide, and adapted to actuate the said slide while writing, substantially as and for the purpose set forth.

13. In a combined writing and adding machine, the combination, with a main frame, of a series of type-bar-actuating levers in said frame, and a rearwardly-extending arm connected with each lever, adapted to be depressed when said lever is depressed, a vertically-moving slide in said frame, provided with slots of varying depths, into each one of which one of said rearwardly-extending arms extends for actuating the said slide, and a registering device having indicating-wheels adapted to be actuated by the downward movement of said slide, substantially as and for the purpose set forth.

14. In a combined writing and adding machine, the combination, with a main frame, of a series of type-bar-actuating levers in said frame, and a rearwardly-extending arm connected with each lever, adapted to be depressed when said lever is depressed, a vertically-moving slide in said frame, provided with slots of various depths, into each one of which one of said rearwardly-extending arms extends for actuating the said slide, and a stud or projection on said slide, a laterally-moving registering device above said main frame, comprising a series of indicating-disks, a series of toothed racks corresponding to the number of disks, each rack being in operative engagement with a disk, and a stud or projection on each rack adapted to be engaged by the said stud or projection on said slide, substantially as and for the purpose set forth.

15. In a combined writing and adding machine, the combination, with a main frame, of a series of type-bar-actuating levers in said frame, and a rearwardly-extending arm connected with each lever, adapted to be depressed when said lever is depressed, a vertically-moving slide in said frame provided with slots of varying depths, into each one of which one of said rearwardly-extending arms extends for actuating the said slide, and a stud or projection on said slide, a laterally-moving registering device above said main frame, comprising a series of indicating-disks, a series of toothed racks, corresponding to the number of disks, each rack being in operative engagement with a disk, and a stud or projection on each rack, adapted to be engaged by the said stud or projection on said slide, and means for the causing of disengagement of the actuated rack from the engaged disk when said slide is disconnected from said rack, to permit the return of the actuated rack to its normal position, substantially as and for the purpose set forth.

16. In a combined writing and adding machine, the combination, with printing-type-bar-actuating levers, of a registering mechanism, comprising, a casing, a series of indicating-disks, a series of toothed racks, each rack having an elongated slot, a spring connected with each rack for its suspension in said casing, a rod extending through the slots in said racks, pivotally-arranged arms between the ends of said rod and the sides of said casing, springs attached to said pivotal arms for normally bringing each rack in engagement with an indicating-disk, and means for actuating the said racks while writing, substantially as and for the purpose set forth.

17. In a combined writing and adding machine, the combination, with printing-type-bar-actuating levers, of a registering mechanism, comprising a casing, a series of indicating-disks, a series of toothed racks, each rack having an elongated slot, a spring connected with each rack for its suspension in said casing, a rod extending through the slots in said racks, pivotally-arranged arms between the ends of said rod and the sides of said casing, springs attached to said pivotal arms for normally bringing each rack in engagement with an indicating-disk, and means for actuating the said racks while writing, comprising a vertically-moving slide in the main frame of the machine, and means connected with said slide for actuating the said racks while writing, substantially as and for the purpose set forth.

18. In a combined writing and adding machine, the combination, with printing-type-bar-actuating levers, of a registering mechanism, comprising a casing, a series of indicating-disks, a series of toothed racks, each rack having an elongated slot, a spring connected with each rack for its suspension in said casing, a rod extending through the slot in said racks, pivotally-arranged arms between the ends of said rod and the sides of said casing, springs attached to said pivotal arms, for normally bringing each rack in engagement with an indicating-disk, and means for actuating the said racks, comprising a vertically-moving slide in the main frame of the machine, and means connected with said slide for actuating the said racks, the said slide being provided with a series of slots of varying depths, and rearwardly-extending arms, corresponding to the number of slots in said slide, said arms registering with the said slots and being adapted to be depressed while writing and thereby producing a downward movement of said slide, substantially as and for the purpose set forth.

19. In a combined writing and adding machine, the combination, with a main frame, of a laterally-moving registering device above said frame, a series of indicating-disks in said device, provided with symbols, a series of type-bar-actuating levers, having keys provided with different symbols, a vertically-moving slide in said frame adapted to be actuated from any one of said levers, said slide being provided with a series of slots, corresponding to the number of said levers, but said slots varying in depth, the said depths being made in proportion to the notations or symbols on the keys of said levers, and means between said slide and said indicating-disks for actuating the said disks, according to the key of the depressed lever, substantially as and for the purpose set forth.

20. In a combined writing and adding machine, the combination, with a main frame, of a laterally-moving registering device above said frame, a series of indicating-disks in said device, provided with symbols, a series of type-bar-actuating levers, having keys provided with different symbols, a vertically-moving slide in said frame, adapted to be actuated from any one of said levers, said slide being provided with a series of slots corresponding to the number of said levers, but said slots varying in depth, the said depths being made in proportion to the notations or symbols on the keys of said levers, and means between said slide and said indicating-disks for actuating the said disks, according to the key of the depressed lever, consisting, essentially, of a series of toothed racks, in engagement with said indicating-disks and with said slides, substantially as and for the purpose set forth.

In testimony that I claim the invention set forth above I have hereunto set my hand this 19th day of March, 1902.

LEVY MAYBAUM.

Witnesses:
FREDK. C. FRAENTZEL,
EDNA MAYBAUM.